(12) United States Patent
Uchida et al.

(10) Patent No.: US 7,910,209 B2
(45) Date of Patent: Mar. 22, 2011

(54) CELLULOSE GRANULES FOR CARRYING FUNCTIONAL SUBSTANCES

(75) Inventors: Toshiyuki Uchida, Echizen (JP);
Yoshikazu Nunome, Echizen (JP);
Hidenao Saito, Echizen (JP)

(73) Assignee: Rengo Co., Ltd., Osaka (JP)

( * ) Notice: Subject to any disclaimer, the term of this patent is extended or adjusted under 35 U.S.C. 154(b) by 0 days.

(21) Appl. No.: 12/310,109

(22) PCT Filed: Dec. 21, 2007

(86) PCT No.: PCT/JP2007/074656
§ 371 (c)(1),
(2), (4) Date: Feb. 11, 2009

(87) PCT Pub. No.: WO2008/078682
PCT Pub. Date: Jul. 3, 2008

(65) Prior Publication Data
US 2009/0246525 A1 Oct. 1, 2009

(30) Foreign Application Priority Data
Dec. 25, 2006 (JP) .................................. 2006-347972

(51) Int. Cl.
*C08B 1/00* (2006.01)
(52) U.S. Cl. ............... 428/403; 428/407; 264/8; 536/56
(58) Field of Classification Search .................. 428/402, 428/407; 264/8; 536/56
See application file for complete search history.

(56) References Cited

U.S. PATENT DOCUMENTS

| 5,972,507 | A * | 10/1999 | Morimoto et al. ............ 428/402 |
| 7,514,552 | B2 * | 4/2009 | Yamasaki et al. ............... 536/56 |
| 2007/0028801 | A1 | 2/2007 | Yamasaki et al. |

FOREIGN PATENT DOCUMENTS

| CN | 1858093 | 11/2006 |
| JP | 1-317538 | 12/1989 |
| JP | 2004-027428 | * 1/2004 |
| JP | 2004-27428 | 1/2004 |
| WO | 2004/106416 | 12/2004 |

OTHER PUBLICATIONS

International Search Report dated Mar. 18, 2008 in the International (PCT) Application PCT/JP2007/074656 of which the present application is the U.S. National Stage.
English translation of Chinese Office Action dated May 12, 2010 issued in connection with Chinese counterpart application of present U.S. application.

* cited by examiner

*Primary Examiner* — Leszek Kiliman
(74) *Attorney, Agent, or Firm* — Wenderoth, Lind & Ponack, L.L.P

(57) ABSTRACT

Cellulose granules small enough such that they can be retained in a cigarette filter and capable of carrying sufficient amounts of volatile functional substance and vaporizing it easily. The cellulose granules are obtained from an extrusion granulating step and a spheronizing step, with smaller variability in particle diameter than that of conventional cellulose granules.

8 Claims, 4 Drawing Sheets

(a)

(b)

CELLULOSE GRANULES FOR CARRYING FUNCTIONAL SUBSTANCES

TECHNICAL FIELD

This invention relates to cellulose granules for carrying volatile functional substances such as flavoring, particularly relating to cellulose granules for carrying functional substances that can release flavoring components by being contained particularly in a cigarette filter.

For cellulose granules carrying volatile functional substances such as flavorings, it is preferable to be able to carry sufficient amounts of volatile functional substance and to be stable in vaporization rate of the functional substance.

Therefore, cellulose granules that can carry sufficient amounts of functional substance have to be porous, having numerous pores that lead from outer surface to inside of the granules. Also, to stabilize the vaporization rate of the functional substance, particle diameter of cellulose granules must be uniform. Further, to retain these granules in a cigarette filter, the average particle diameter must be as small as 1.5 mm or smaller.

As cellulose granules, Patent document 1 discloses granules made by putting a kneaded mixture of defiberized fluff pulp and binder aqueous solution to an extrusion granulating step, a spheronizing and a drying step in order. The cellulose granules disclosed in Patent document 1 are porous with numerous pores that lead from the surface to the inside of the granules, and able to carry sufficient amount of functional substance and vaporize it.

Patent document 1: JP Patent Publication 2004-27428 A

DISCLOSURE OF THE INVENTION

Object of the Invention

However, when one tried to obtain cellulose granules with as small as 1.5 mm or smaller diameter in accordance with the disclosure in Patent document 1, granulation was hindered due to clogging of outlets in the extrusion granulating step since the defiberized pulp material with long fiber length is used, or, even if granules were obtained, the particle diameter varied widely and granules with a uniform diameter could not be obtained.

Therefore, an object of this invention is to obtain cellulose granules for carrying functional substances that are uniform in diameter and having an average particle diameter of 1.5 mm or smaller.

Means to Achieve the Object

To achieve this object, this invention uses cellulose fibers with an average fiber length of 0.1 mm or longer and 0.5 mm or shorter, and an average polymerization degree of 400 to 1200 as a cellulosic material. By this, cellulose granules can be obtained that are uniform in diameter and have an average particle diameter of 1.5 mm or smaller.

EFFECT OF THE INVENTION

The cellulose granules for carrying functional substances according to this invention are, as described above, uniform in diameter with an average particle diameter of 1.5 mm or smaller and therefore, amounts of functional substance retention and vaporization rate can be stabilized as designed. Therefore, by using the cellulose granules for carrying functional substances according to this invention carrying flavoring for a cigarette filter, a cigarette with stable flavor can be obtained.

DESCRIPTION OF REFERENCE NUMERALS

Figure 1:
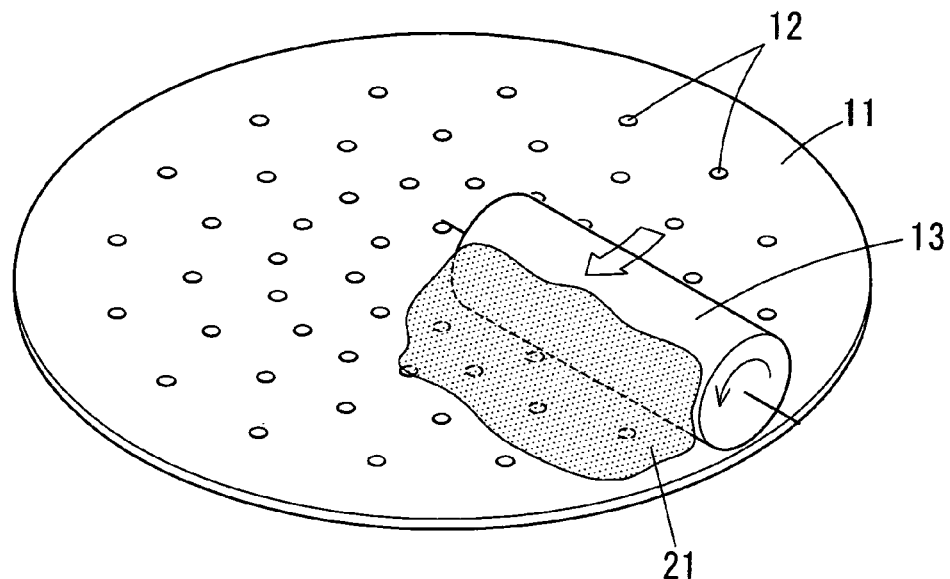
[FIG. 1] Schematic view showing a disc pelleter for performing the extrusion granulating step

11 Disc
12 Holes
13 Roller
14 Cutter
21 Kneaded mixture
22 Pellet
25 Disc
26 Projection
27 Groove
28 Spherical granules
31 Cigarette
32 Filter
33 Additive for cigarette filter
41 Dryer
42 Filling pipe
43 Cotton ball
44 Cellulose granules
45 Pump

DETAILED DESCRIPTION OF THE PREFERRED EMBODIMENTS

The following is a detailed description of this invention. This invention is directed to cellulose granules for carrying functional substances with an average particle diameter of 1.5 mm or smaller obtained by introducing a kneaded mixture of cellulose fibers and a binder into an extrusion granulating step, a spheronizing step and a drying step, characterized in using the cellulose fibers with an average fiber length of 0.1 mm to 0.5 mm.

Cellulose fibers forming these cellulose granules are fluff pulp obtained by defiberizing ordinary pulp such as wood pulp, kraft pulp or dissolving pulp. Specific defiberizing methods include mechanical defiberizing or mechanical defiberizing after chemical processing such as acid hydrolysis. Mechanical defiberizing methods include a method using a cutting mill or a ball mill. By this method, the cellulose chains of the cellulose fibers are partially severed, so that its polymerization degree decreases. Also, by performing chemical processing such as acid hydrolysis, the polymerization degree of cellulose fibers is reduced further. This makes fragmentation by mechanical milling easier. By defiberizing the pulp in these methods, cellulose fibers meeting the average fiber length and polymerization requirements cited below can be obtained. Because such cellulose fibers are short in fiber length and low in strength, it can be easily extruded in the extrusion granulating step. Thus, cellulose granules can be produced easily from such cellulose fibers. The cellulose granules thus produced are more uniform in particle diameter than those formed from a pulp that is defiberized by only mechanical beating.

Also, the acid-hydrolyzed cellulose fibers are especially preferable to only mechanically milled cellulose fibers since its polymerization degree further decreases. Further, these acid-hydrolyzed cellulose fibers are preferable for obtaining final cellulose granules for carrying functional substances with more uniform particle diameters. The acid used for this acid-hydrolysis is not limited to specific types, and mineral acid such as sulfuric acid and hydrochloric acid may be used. Cellulose fibers used in this invention can be obtained by immersing cellulose fibers in an aqueous solution of these acids to acid-hydrolyze the cellulose chains and then filtrating, rinsing with water, dehydrating, drying, milling and sieving.

The average fiber length of the cellulose fibers need be 0.1 mm or longer, preferably 0.17 mm or longer. The longer the average fiber length is, the more porous the cellulose granules obtained become. Therefore, if the average fiber length is less than 0.1 mm, the inside of the final cellulose granules becomes too dense and less pores can be formed, hence the amount of functional substance retention becomes insufficient. On the other hand, the average fiber length need be 0.5 mm or shorter, preferably 0.3 mm or shorter. If the fiber length is longer than the diameter r of the holes from which the kneaded mixture is extruded in the below-mentioned granulating step, fibers may be caught in holes and this can cause clogging. Therefore fiber length is preferably not longer than the hole diameter. Since the diameter of the obtained granules depends on this hole diameter r, it is preferable that the fiber length is shorter than the intended particle diameter. If the average fiber length is close to the intended cellulose particle diameter, such fibers may include fibers longer than the intended particle diameter. This makes it impossible to obtain granules having an intended diameter. The average fiber length described here is the length weighted average fiber length measured by a fiber length measurement device "FiberLab" made by Kajaani in accordance with "JAPAN TAPPI paper pulp test method No. 52: 2000, Pulp and paper-fiber length test method-Optical automatic measurement".

In this invention, the diameter of the holes used in the extrusion granulating step is at least 0.5 mm as mentioned later, and, in this case, unless individual fiber lengths of the fibers used are 0.5 mm or shorter, fibers will be tangled with one another and they will not be able to pass through the holes. Since the lengths of individual fibers actually vary, the average fiber length is preferably shorter than the hole diameter. However, the longer the average fiber length, the coarser the inside of the granules, and thus the larger the inner pores for carrying functional substances. Thus, the average fiber length is preferably as long as possible provided such long fibers do not clog the holes.

Also, the average polymerization degree of the cellulose fibers need be 400 or higher, preferably 500 or higher. Cellulose with higher polymerization degree generally makes fibers harder, and harder fibers are less likely to be bent inside granules when they are formed into cellulose granules. Such fiber can easily make the inside of the granules more porous, thus reducing the bulk density of the granules and increasing the amount of functional substances that can be carried by the granules. If the average polymerization degree is below 400, the obtained cellulose particles are too dense and the amount of functional substances carried decreases. On the other hand, with an increase in the polymerization degree of the fibers, variability in diameter of the obtained cellulose granules increases, and the average polymerization degree above 1200 is unsuitable for the purpose of this invention, which is to obtain granules with less variability. Using cellulose fibers with an average polymerization degree of 900 or lower is especially preferable since variability in diameter of the obtained cellulose granules is further reduced. Acid-hydrolyzed cellulose fibers have an average polymerization degree of 900 or lower in most cases since hydrolysis makes the cellulose chains shorter. The average polymerization degree used here can be measured using a measurement method for polymerization degree of crystalline cellulose listed in the Japanese Pharmacopoeia Fourteenth Edition Japanese Pharmacopoeia Part II Official Monographs. Such cellulose fibers include, for example, a powder cellulose listed in Japanese Pharmacopoeia.

Since cellulose chains become shorter by acid-hydrolysis or mechanical milling, cellulose fibers with a longer average fiber length basically tend to have higher average polymerization degree. Although cellulose fibers with a longer average fiber length are used to increase the amount of functional substance retention, the problem as described above will occur when the average polymerization degree of the cellulose fibers is too high. Therefore, it is preferable to choose the average fiber length and the average polymerization degree of the cellulose fibers considering the balance between the amount of functional substance retention and uniformity in particle diameter depending on the intended use of the cellulose granules to be obtained.

Microcrystalline cellulose with an average polymerization degree of 350 or lower and an average fiber length of 0.2 mm or shorter is produced by acid-hydrolysis. But this cellulose is too low in average polymerization degree and therefore is not included in the cellulose fibers used in this invention. This is because cellulose granules using such microcrystalline cellulose instead of the above-mentioned cellulose fibers are too dense to carry sufficient amounts of functional substances.

The binder serves to bind individual fibers in the cellulose fibers. The binder works as a glue to adhere fibers together, thus providing granules in which fibers do not come apart when carrying functional substance. To bind fibers together with this binder, the binder is dissolved in water to form an aqueous binder solution and then kneaded together with the cellulose fibers, or water is added to a mixture of the cellulose material and the binder. This binder is preferably a hydrophilic polymer. Specifically, such binders include water-soluble polymers such as starch, methylcellulose, hydroxypropyl cellulose, hydroxypropyl methylcellulose, carboxyl methylcellulose, alginate, guar gum, gum arabic, agar, carageenan, polyacrylic acid, polyvinyl alcohol and polyethylene glycol. The binder may comprise one of these polymers or a mixture thereof. Among these materials, polyvinyl alcohol is especially preferable because it can easily bind cellulose fibers together and makes it easier to form granules.

To add color to cellulose granules, a coloring agent may be mixed into the aqueous binder solution, a coloring agent and water may be mixed into a mixture of the cellulose fibers and the binder, or dyed fibers may be mixed.

The content of the binder in the aqueous binder solution is preferably 0.5 wt % or higher, more preferably 1 wt % or higher. If the binder content is less than 0.5 wt %, the solution is too thin and forming of granules may be difficult because of lack of binding force. On the other hand, binder is preferably 10 wt % or less, more preferably 8 wt % or less. If the binder content is higher than 10 wt %, binding force to bind above-mentioned individual fibers is too strong and large granules may be formed due to aggregation of small granules, or the binder may not adhere uniformly to cellulose fibers because of too high viscosity.

Also, when adding water to the mixture, the mixing weight ratio of water and binder is preferably 199:1 to 9:1, more preferably 99:1 to 92:8. If the water content ratio is higher than exceeds 199:1, the binder becomes too thin and granulation may become difficult. On the other hand, if the binder content exceeds 9:1, binding force becomes too high.

The mixing weight ratio of the cellulose fibers and the binder is preferably 100:0.5 to 100:10. If the content ratio of the cellulose fibers exceeds 100:0.5, the mixture may not set into granules because of insufficient polymer content. On the other hand, if the content of the cellulose fibers is less than 100:10, pores in the obtained cellulose granules will be filled with the binder and the amount of functional substance retention may become too small.

A ordinary kneader may be used to knead the cellulose fibers and the aqueous binder solution to obtain a kneaded mixture.

The mixture is introduced into the extrusion granulating step, the spheronizing step and the drying step in order to obtain cellulose granules for carrying functional substances.

Figure 2:
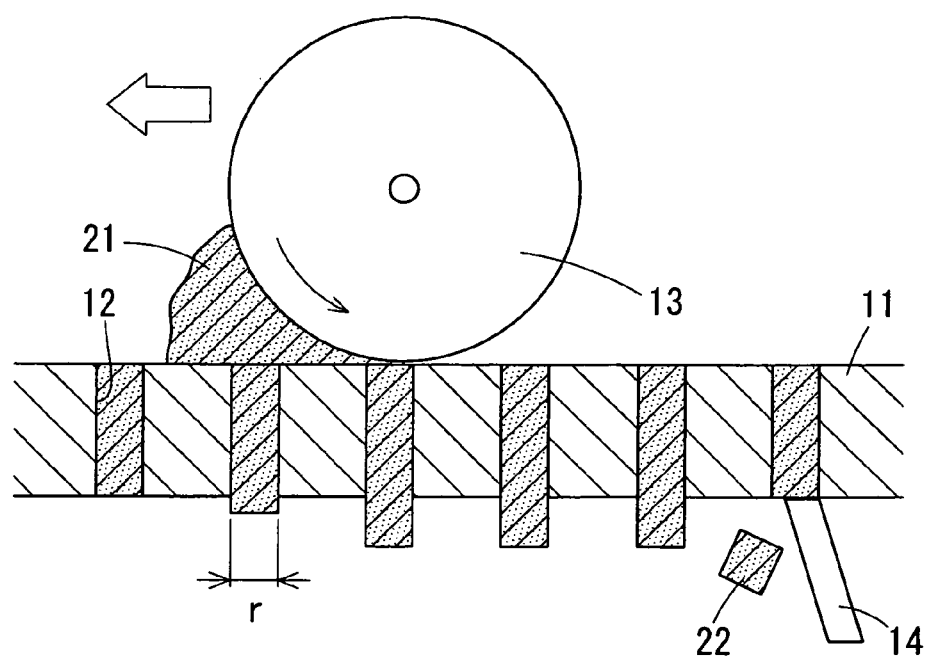
[FIG. 2] Sectional view of the disc pelleter of FIG. 1

First, the extrusion granulating step is a step in which the mixture is extruded through holes to form pillar-shaped pellets. A wet or semi-dry extrusion granulating machine may be used. Extrusion methods include, for example, an extrusion granulating method using a disc pelleter as an extrusion granulating machine. The disc pelleter may be a roller disc type device as shown in FIGS. 1 and 2. This device comprises a disc 11 with a plurality of holes 12 having a diameter r and a roller 13 that rolls on the surface of the disc 11. To produce pillar-shaped pellets 22, a kneaded mixture 21 is fed between the disc 11 and the roller 13. The mixture is then compressed by rotation of the roller 13, and extruded through holes 12 of the disc 11. The holes are preferably round holes since the obtained pellets become cylindrical and this makes production easier. Also, among pelleters, a fine disc pelleter to form pellets with a diameter of 2 mm or smaller is preferred in this invention. In this case, the thickness of the disc 11 becomes approximately the same as the hole diameter r.

The extruded kneaded mixture 21 may be scraped with a cutter 14 fixed so that it contacts the bottom of the disc 11 when the mixture becomes pillars having approximately the same length as the hole diameter and may be formed into pellets with a similar size to the intended granules. Alternatively, the kneaded mixture may be extruded enough before being scraped with the cutter 14 to form pillar-shaped pellets 22 sufficiently longer than the hole diameter. Further alternatively, without providing the cutter 14, long pellets may be allowed to break and fall by gravity. Long pellets thus produced have a length of approximately 1 cm to 10 cm. When obtaining long pillar-shaped pellets, those pellets should be divided in the longitudinal direction in the below-mentioned spheronizing step to obtain granules with a similar diameter to the hole diameter. In both cases, to obtain near-spherical granules, the particle diameter becomes near the pellet diameter. The diameter of such pellets depends on the hole diameter r of the fine disc pelleter.

Therefore, the hole diameter r of the holes is preferably 0.5 mm or larger, more preferably 0.7 mm or larger. If the hole diameter is smaller than 0.5 mm, they may be clogged with cellulose fibers. On the other hand, the hole diameter r is preferably 1.5 mm or smaller, more preferably 1.3 mm or smaller. If the hole diameter exceeds 1.5 mm, the diameter of the obtained granules may exceed 1.5 mm, which is unsuitable to be contained in a cigarette filter.

For an extrusion granulating machine used to perform the extrusion granulating, while a roller disc pelleter shown in FIGS. 1 and 2 excels in productivity and formability, an ordinary extrusion granulating machine for forming pellets by extruding the mixture to a die having holes in its extrusion surface may be used.

Figure 3:
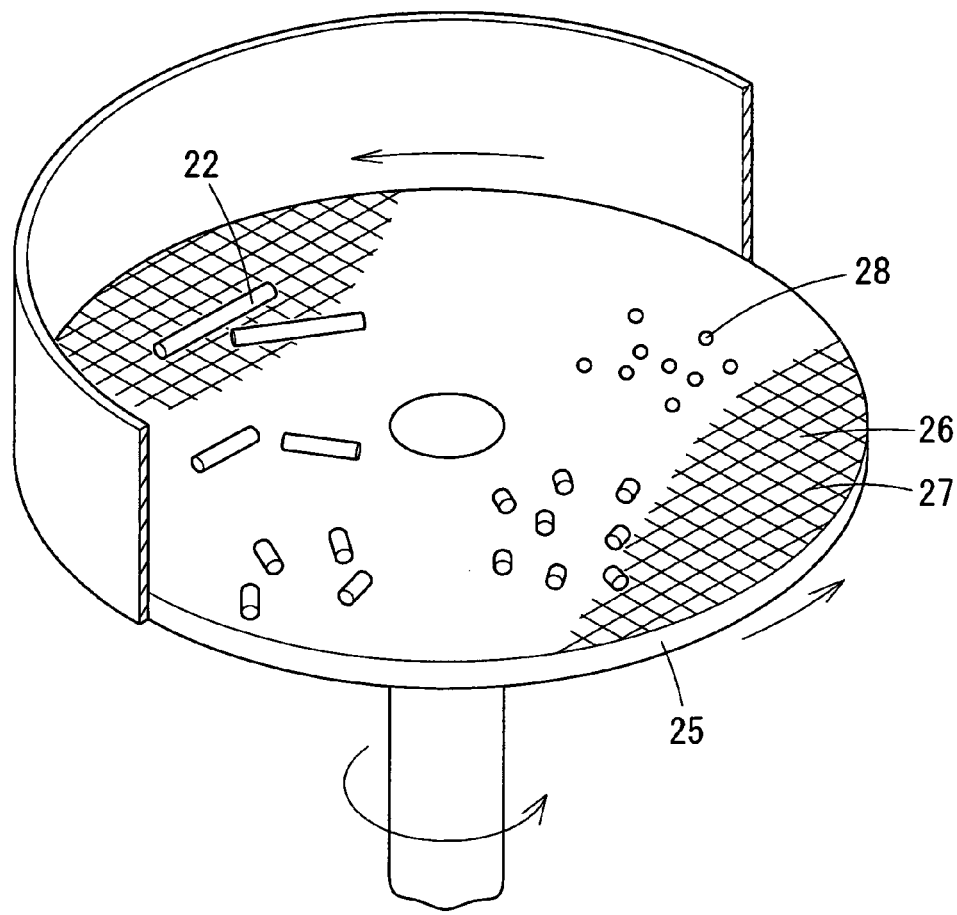
[FIG. 3] (a) Schematic view showing an example of Marumerizer for performing the granulating step, (b) Sectional schematic view of a disc of a Marumerizer
Figure 3:
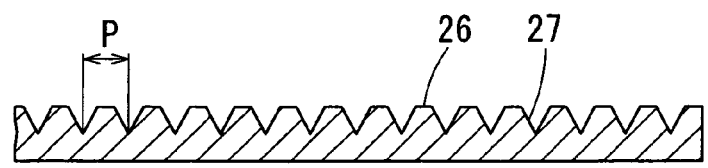
Figure 4:
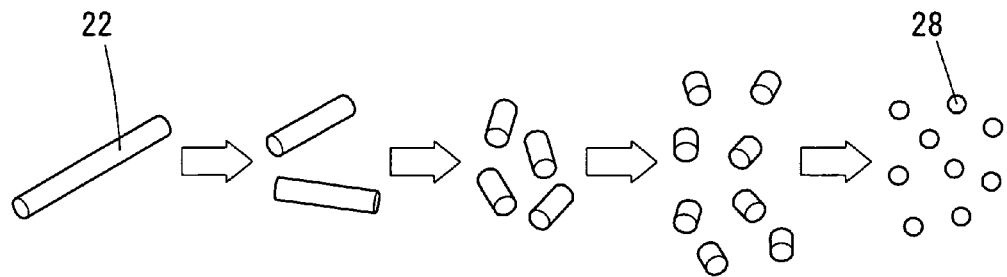
[FIG. 4] Schematic view showing change from pellets to spherical granules during the spheronizing step

Next, the spheronizing step is a step for forming the pillar-shaped pellets obtained in the extrusion granulating step into spherical particles having diameters substantially equal to each other. Specific methods to round pellets include, for example, a spheronizing method in which pellets are rolled using Marumerizer. This Marumerizer is, as shown in FIG. 3, a machine including a rotating disc 25 having lattice-forming grooves 27 that define flat-topped protrusions 26. By rolling pellets 22 on the disc 25, their edges are removed and the pellets are formed into a round shape. A schematic drawing of the entire Marumerizer is shown in FIG. 3(*a*) and a section of its disc 25 is shown in FIG. 3(*b*). While the grooves 27 in FIG. 3(*a*) are actually arranged at smaller intervals, the drawing shows only lines that form the bottoms of the grooves 27 on an enlarged scale. The pellets 22 are repeatedly collided against the outer peripheral wall by centrifugal force, returned to inner side, and again collided against the outer peripheral wall by centrifugal force. In this time, by being exposed to shocks in collisions against the projections 26 and the grooves 27 between the projections while rolling and revolving, the pellets 22 are broken into small pieces as shown in FIG. 4, regardless of the pellet length originally introduced into this step. By further rotating and rolling the pellets, their edges are gradually removed, most of the dust of pellets produced adheres to the granules, so that spherical granules 28 with approximately the same diameter as the thickness of the original pellets are formed.

The pitch P between adjacent lattice-forming grooves 27 formed in the disc 25 is preferably 1 mm to 5 mm, more preferably 2 mm to 3 mm. If the pitch is smaller than 1 mm, it is difficult to form spherical granules. On the other hand, granules tend to be broken by the disc revolution if the pitch is larger than 5 mm. If the diameter of the disc is 40 cm and the above-mentioned pitch is 3 mm, the disc is preferably revolved at 200 rpm or higher. At revolution lower than 200 rpm, pellets merely roll on the disc and it is difficult to break pellets into small pieces and remove their edges. On the other hand, revolution is preferably not higher than 1000 rpm. If it exceeds 1000 rpm, pellets tend to be broken into too small pieces. That is, granules may be broken too small beyond spherical shape. A disc with a different diameter should be rotated at such a speed that the outer peripheral speed of the disc is equal to that of the disk having a diameter of 40 cm. The diameter of the disc should be within the range of approximately 20 cm to 100 cm.

Granules just after being rolled in the spheronizing step contain a large amount of water from the aqueous solution used in kneading, which should be removed. Thus, after the spheronizing step, granules are put into a drying step to obtain cellulose granules for carrying functional substances according to this invention.

Furthermore, it is preferable to put the granules dried in the drying step into a sieving step to remove minute particles that may be contained in granules with uniform diameters. While the cellulose granules for carrying functional substances according to this invention have uniform diameters, besides these granules, fragments are generated when breaking pellets and removing their edges. These fragments adhere to the granules and are integrated into them during the granulating step. But some may remain as minute particles. These particles have to be removed. Otherwise they cause non-uniform diameter of the granules. Specific methods for this sieving include sieving with ordinary meshes. While the size of the mesh depends on the intended average particle diameter, sieves that remove at least fine powder particles with a diameter of 0.4 mm or smaller are preferable.

Figure 5:
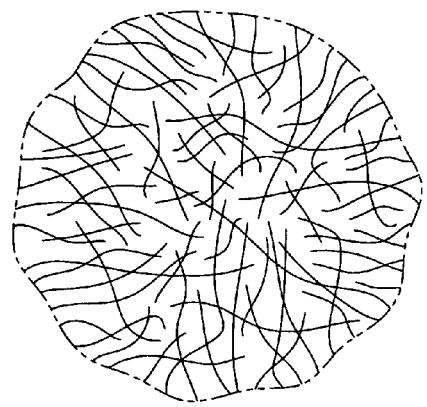
[FIG. 5] Schematic view showing a section of a cellulose granule according to this invention

As mentioned above, the cellulose granules for carrying functional substances that are obtained through the extrusion granulating step, the spheronizing step and the drying step have the structure as shown in the schematic sectional drawing of FIG. 5, having pores inside many of which lead to outside. These cellulose granules for carrying functional substances can carry functional substances from outside into these pores, and also allows easy vaporization of the carried volatile functional substances.

The cellulose granules for carrying functional substances according to this invention have preferably a bulk density of 0.8 or less. If the bulk density exceeds 0.8, the inside of the granules becomes too dense to carry a sufficient amount of functional substances. Actually, most cellulose granules produced under the above-mentioned conditions meet this bulk density requirement. On the other hand, it is structurally difficult to make bulk density below 0.35, and in most cases, bulk density becomes 0.35 or higher.

Cellulose granules for carrying functional substances according to this invention have a particle diameter that is close to the diameter r of the holes of the device used in the extrusion granulating step. This is because the granules are obtained from the pellets with a diameter of r, broken into lengths near r and then rounded as their edges are removed. Their average particle diameter is preferably 0.3 mm or larger, more preferably 0.5 mm or larger. If it is below 0.3 mm, the granules become too small to contain sufficient pores inside. Also, to be used as an additive agent to be retained in a cigarette filter, granules with an average particle diameter of 0.3 mm or smaller may cause clogging in the cigarette filter and air resistance in smoking may increase. On the other hand, the average particle diameter is preferably 1.5 mm or smaller, more preferably 1.2 mm or smaller. If it exceeds 1.5 mm, the area per unit weight exposed to external air becomes too small to keep sufficient vaporization rate of the carried functional substances. Also, granules larger than 1.5 mm are difficult to be retained in a cigarette filter. The average particle diameter mentioned herein is the average particle diameter by mass, measured by a sieving method.

By using cellulose fibers with the above-mentioned average fiber length and an average polymerization degree of 400 to 1200, cellulose granules for carrying functional substances according to this invention become smaller in variation of particle diameter. Also, using cellulose fibers with polymerization degree of 400 to 900 especially reduces the particle size distribution. Specifically, the particle size distribution was evaluated by a sieving method, measuring the diameters of the granules that had passed respective sieves by 25 wt % (D25), 50 wt % (D50) and 75 wt % (D75), and taking D50 as the average particle diameter, D25/D75 as uniformity of particle size distribution. This particle size distribution value is preferably 0.5 or higher, more preferably 0.6 or higher. In most cases, cellulose granules produced under the above-mentioned conditions and steps meet this requirement. This is because the pellets from which the particles are made are pillars with a diameter r, a sole diameter of the holes, and they are rolled into granules with a diameter similar to hole diameter r during the granulating step. The higher the value of D25/D75 is, the more uniform the granule particles are. This value is ideally 1.

Methods for carrying functional substances in cellulose granules for carrying functional substances according to this invention include, for example, spraying a functional substance on the granules, immersing the granules in a functional substance, and heating and melting a functional substance with an embedding agent and carrying the molten mixture in the granules. This embedding agent is a material that is solid at room temperature and can be mixed with the above-mentioned functional substance when heated and melted. Specifically, such embedding agents include paraffin wax, rosin resin and rubber resin. The embedding agent makes it possible to restrain migration of the functional substance, or to control vaporization rate of the functional substance. While there is no specific limitation for volatile functional substances to be carried, granules that gradually release the carried volatile functional substance can be obtained when using flavorings such as menthol, peppermint oil, limonene, and orange flavoring.

Figure 6:
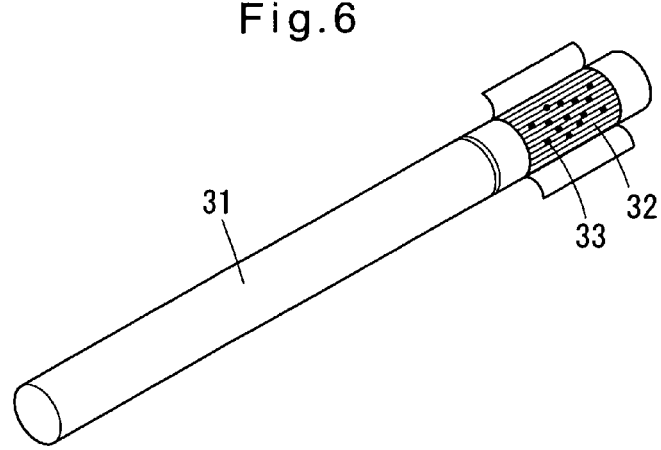
[FIG. 6] Schematic view of a cigarette containing cellulose granules according to this invention as an additive

Cellulose granules carrying the above-mentioned volatile functional substances in this way can be used as an additive agent to be retained in a cigarette filter. Specifically, as shown in FIG. 6, additive agents 33 are dispersed in fibers of a filter 32 made of a fiber material such as acetal and provided at the mouth end of a cigarette 31. Alternatively, cigarette filter additives 33 may be packed in a space formed in the filter. A cigarette added with the additive agents for a cigarette filter 33 in its filter has scent of the above-mentioned volatile functional substances released from the additive agent for a cigarette filter that can be smelled along with the flavor of the cigarette when smoking through the filter.

Since the cellulose granules for carrying functional substances according to this invention have uniform particle diameters, total amount of a functional substance and its vaporization rate can be easily controlled to the intended values by adjusting the weight or volume of granules when the volatile substance is included inside. When adding the granules to a cigarette filter, it is possible to reduce variability in the amount of functional substance added per cigarette and accordingly in vaporization rate of the volatile functional substance. This results in reduced possibility of flavor change of a cigarette caused by irregular rate of flavoring release.

EXAMPLES

The following is a detailed description of the examples of cellulose granules for carrying functional substance according to this invention.

Cellulose Fibers Used are Listed Below:

Bleached kraft pulp . . . (LBKP made by Nippon Paper Industries Co., Ltd., mechanically defiberized so that its average fiber length is 0.6 mm and average polymerization degree is 1400; hereinafter referred to as "defiberized LBKP 1")

Bleached kraft pulp . . . (LBKP made by Nippon Paper Industries Co., Ltd., mechanically defiberized so that its average fiber length is 0.4 mm and average polymerization degree is 1300; hereinafter referred to as "defiberized LBKP 2")

Bleached kraft pulp . . . (LBKP made by Nippon Paper Industries Co., Ltd., mechanically defiberized so that its average fiber length is 0.27 mm and average polymerization degree is 1100; hereinafter referred to as "defiberized LBKP 3")

Acid-hydrolyzed cellulose powder . . . (KC Flock W-50S made by Nippon Paper Chemicals Co., Ltd., 0.30 mm in average fiber length, 830 in average polymerization degree; hereinafter referred to as "KC W-50S")

Acid-hydrolyzed cellulose powder . . . (KC Flock W-50 made by Nippon Chemicals Co., Ltd.; 0.27 mm in average fiber length, 810 in average polymerization degree; hereinafter referred to as "KC W-50")

Acid-hydrolyzed cellulose powder . . . (KC Flock W-100 made by Nippon Paper Chemicals Co., Ltd., 0.21 mm in average fiber length, 690 in average polymerization degree; hereinafter referred to as "KC W-100")

Acid-hydrolyzed cellulose powder . . . (KC Flock W-200 made by Nippon Paper Chemicals Co., Ltd., 0.17 mm in average length of fiber, 540 in average polymerization degree; hereinafter referred to as "KC W-200")

Acid-hydrolyzed cellulose powder . . . (KC Flock W-400 made by Nippon Paper Chemicals Co., Ltd., 0.15 mm in average fiber length, 370 in average polymerization degree; hereinafter referred to as "KC W-400")

Microcrystalline cellulose . . . (Avicel made by Merck Ltd., 0.17 mm in average fiber length, 200 in average polymerization degree, hereinafter referred to as "microcrystalline cellulose")

The average fiber length of each material listed above was measured using a fiber length measurement device "FiberLab" made by Kajaani, and the average polymerization degree was measured in accordance with the polymerization measurement method for crystalline cellulose listed in The Japanese Pharmacopoeia Fourteenth Edition Japanese Pharmacopoeia Part II Official Monographs using a capillary viscometer and copper ethylenediamine reagent as a solvent.

Review of Cellulose Fiber Materials

Example 1

An aqueous polyvinyl alcohol solution (PVA124 made by Kuraray Co., Ltd; 2.7 wt %) as an aqueous binder solution and defiberized LBKP 3 with an average fiber length of 0.27 mm as cellulose fibers were put into a high shear mixer granulator and kneader (SPG-25 made by Dalton Co., Ltd) at the ratio of 0.04:1 and kneaded together to obtain a kneaded mixture. While the high shear mixer granulator and kneader has a function to granulate, it was used only for kneading in this example.

The obtained kneaded mixture was then put into a fine disc pelleter (PV-5 made by Dalton Co., Ltd.) with 1-mm diameter round holes to obtain rod-shaped pellets having a diameter of approximately 1 mm and a length of approximately 3 cm. Then these pellets were put into a Marumerizer (Q-400 made by Dalton Co., Ltd.), and the disk of the Marumerizer was rotated at 700 rpm for 7 minutes to obtain spherical granules. The granules were dried in a vibration dryer (MDV-1200 made by Dalton Co., Ltd.) at 100° C. to yield cellulose granules with an average particle diameter of 0.77 mm. For measurement of the average particle diameter and particle size distribution of the cellulose granules, sieving was performed with sieves whose openings were respectively 0.5 mm, 0.6 mm, 0.71 mm, 0.85 mm, 1.00 mm, 1.18 mm, 1.40 mm and 1.70 mm (JIS). In this process, the diameters of the granules that had passed respective sieves by 25 wt % (D25), 50 wt % (D50) and 75 wt % (D75) were measured, and D50 was taken as the average particle diameter. Also, the particle size distribution of the cellulose granules was expressed by D25/D75, and its value was 0.53.

The weight of the obtained cellulose granules per liter was measured using a graduated cylinder and the bulk density was calculated. The result is shown in Table 1. Also, D-limonene (made by Nacalai Tesque, Inc.) was impregnated into the cellulose granule as a functional substance, and the amount of functional substance carried by 1 g of the cellulose granules was measured. This was done by putting 10 g of cellulose granules in an Erlenmeyer flask and, while adding D-limonene as a functional substance, measuring the total amount of the functional substance added up to the point where the functional substance could no more be absorbed into the cellulose granules and the flask surface was wetted with excess functional substance. The result is shown in Table 1.

TABLE 1

| | Cellulose fibers | | | | | | Amount of carried functional | Amount of embedded functional |
| | Type | Fiber length | Polymerization degree | Binder | Bulk density | Average particle diameter | Size distribution D25/D75 | substance (g/g) | substance (g/g) |
| --- | --- | --- | --- | --- | --- | --- | --- | --- | --- |
| Comparative Example 1 | Defiberized LBKP 1 | 0.60 mm | 1400 | PVA | Impossible to produce | — | — | — | — |
| Comparative Example 2 | Defiberized LBKP 2 | 0.40 mm | 1300 | PVA | 0.37 | 0.90 mm | 0.40 | 0.28 | 0.31 |
| Example 1 | Defiberized LBKP 3 | 0.27 mm | 1100 | PVA | 0.45 | 0.77 mm | 0.53 | 0.24 | 0.28 |
| Example 2 | KC W-50S | 0.30 mm | 830 | PVA | 0.55 | 0.82 mm | 0.65 | 0.22 | 0.25 |
| Example 3 | KC W-50 | 0.27 mm | 810 | PVA | 0.62 | 0.82 mm | 0.70 | 0.20 | 0.23 |
| Example 4 | KC W-100 | 0.21 mm | 690 | PVA | 0.74 | 0.81 mm | 0.77 | 0.16 | 0.18 |
| Example 5 | KC W-200 | 0.17 mm | 540 | PVA | 0.78 | 0.80 mm | 0.78 | 0.12 | 0.14 |
| Comparative Example 3 | KC W-400 | 0.15 mm | 370 | PVA | 0.90 | 0.80 mm | 0.78 | 0.05 | 0.06 |
| Comparative Example 4 | Microcrystalline cellulose | 0.17 mm | 200 | PVA | 0.85 | 0.80 mm | 0.78 | 0.05 | 0.06 |
| Example 6 | KC W-50 | 0.27 mm | 810 | MC | 0.62 | 0.80 mm | 0.65 | 0.20 | 0.23 |
| Example 7 | KC W-50 | 0.27 mm | 810 | HPMC | 0.62 | 0.80 mm | 0.65 | 0.20 | 0.23 |

Further, menthol (made by Nagaoka & Co., Ltd.) as flavoring and wax (HNP9 made by Nippon Seiro Co., Ltd.) were melted and kneaded together at 90° C., and the thus obtained kneaded mixture was impregnated into the cellulose granules and carried. The amount of the embedded mixture per gram of the cellulose granules was measured. The result is shown in Table 1.

Comparative Example 1

A fiber mixture was made using defiberized LBKP 1 with 0.6 mm average fiber length instead of the defiberized LBKP 1 used in Example 1 and put into the fine disc pelleter. The 1-mm diameter round holes were obstructed by the mixture, so that it was impossible to produce cellulose granules.

Comparative Example 2

Cellulose granules were obtained in the same manner as Example 1 except for using defiberized LBKP 2 instead of the defiberized LBKP 3 used in Example 1. The result is shown in Table 1. While the amounts of carried and embedded functional substances were approximately the same as those of Example 1, D25/D75 granule distribution was below 0.5, which was wider than that of Example 1.

Examples 2, 3, 4 and 5 and Comparative Example 3

Using acid-hydrolyzed celluloses KC W-50S with 0.30 mm average fiber length (Example 2), KC W-50 with 0.27 mm average fiber length (Example 3), KC W-100 with 0.21 mm average fiber length (Example 4), KC W-200 with 0.17 mm average fiber length (Example 5) and KC W-400 with 0.15 mm average fiber length (Comparative Example 3), respective cellulose granules were obtained in the same manner as that of Example 1. The same measurements as in Example 1 were taken for the respective granules and the results are shown in Table 1. In Examples 2, 3, 4 and 5, sufficient amounts of functional substance were carried and the particle diameters for each case were uniform. However, in Comparative Example 3, whose average polymerization degree was below 400, the functional substance retention amount was remarkably small, though the particle diameters were uniform. In embedding using wax, while Examples 2 to 5 could embed sufficient amounts of functional substances, the embedded amount in Comparative Example 3 was significantly small even compared with Example 5.

Comparative Example 4

Cellulose granules were prepared taking the same steps as in Example 1, except for using microcrystalline cellulose instead of the defiberized LBKP 3 used in Example 1. The same measurements as in Example 1 were taken for the obtained cellulose granules. The results are shown in Table 1. The bulk density became too high and the functional substance retention amount was significantly small. In embedding using wax, the embedded functional substance amount was significantly small even compared with Example 5.

Production of Granules Using Different Binders

Example 6

Using methylcellulose (Metolose SM-400 made by Shin-Etsu Chemical Co., Ltd.; abbreviated to "MC" in the table) as a binder and acid-hydrolyzed cellulose KC W-50 with 0.27 mm average fiber length, with the weight ratio of the binder and the cellulose fibers 0.02:1, these materials were added to a high shear mixer granulator and kneader (SPG-5 made by Dalton Co., Ltd.) and mixed together. Then, water was further added by an amount 1.6 times the amount of the cellulose and the materials were kneaded together to obtain a kneaded mixture. The kneaded mixture was put into the extrusion granulating and the spheronizing steps under the same conditions as in Example 1 to obtain cellulose granules, and the same measurements as in Example 1 were made. The results are shown in Table 1. These cellulose granules carried sufficient amounts of functional substance and their particle diameters were also uniform.

Example 7

Cellulose granules were obtained in the same manner as in Example 1, except for using hydroxypropyl methylcellulose (Metolose 60SH-10000 made by Shin-Etsu Chemical Co., Ltd.) as a binder, and the same measurements as in Example 1 were made. The results are shown in Table 1. The cellulose granules thus obtained could carry sufficient amounts of functional substance and their particle diameters were uniform.

Measurement of Volatility

Example 8

Using the cellulose granules obtained in Example 1, granules impregnated and embedded with menthol (made by Nagaoka & Co., Ltd.), and granules impregnated and embedded with orange flavor (made by Nippon Koryo Yakuhin Kaisha Ltd.) were prepared.

(Impregnation)

The liquid orange flavor was used without heating. 95 g of cellulose granules were put into 5 g of the orange flavor, mixed uniformly, and then taken out. Since menthol is solid at room temperature, it was heated above its melting point, and 95 g of cellulose granules were put into 5 g of menthol and mixed uniformly. Then the granules were taken out.

(Embedding)

Two potions of 12 g of wax (HNP9 made by Nippon Seiro Co., Ltd.) melted at 90° C. were prepared, added with 5 g of orange flavor and menthol respectively, and then each was mixed and melted uniformly. Then each potion was added with 83 g of cellulose granules and mixed uniformly. Both were cooled after mixing, and the granules were taken out.

(Assessment of Volatility of the Carried Functional Substances)

Figure 7:
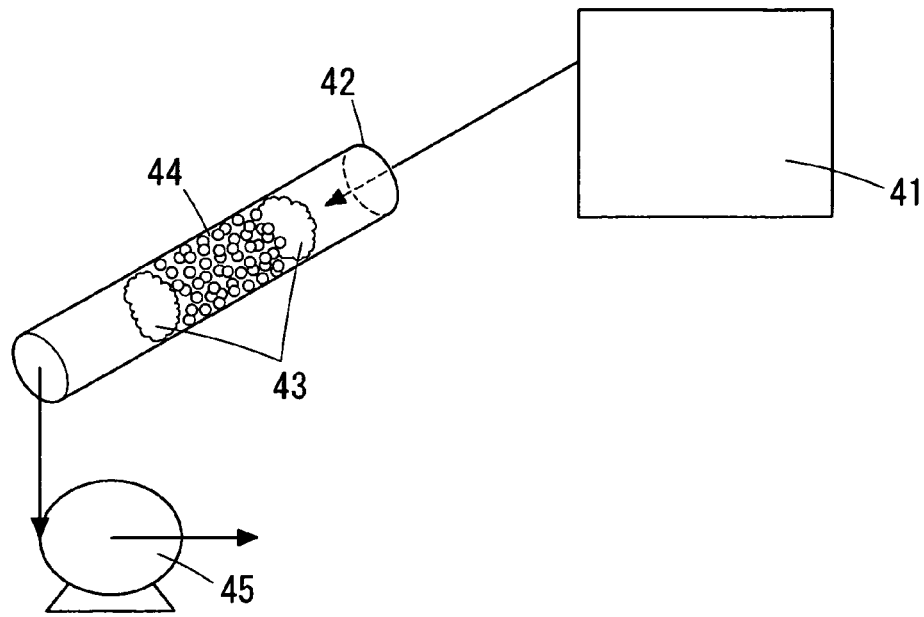
[FIG. 7] Schematic view of a filling pipe used in Example 8
Figure 8:
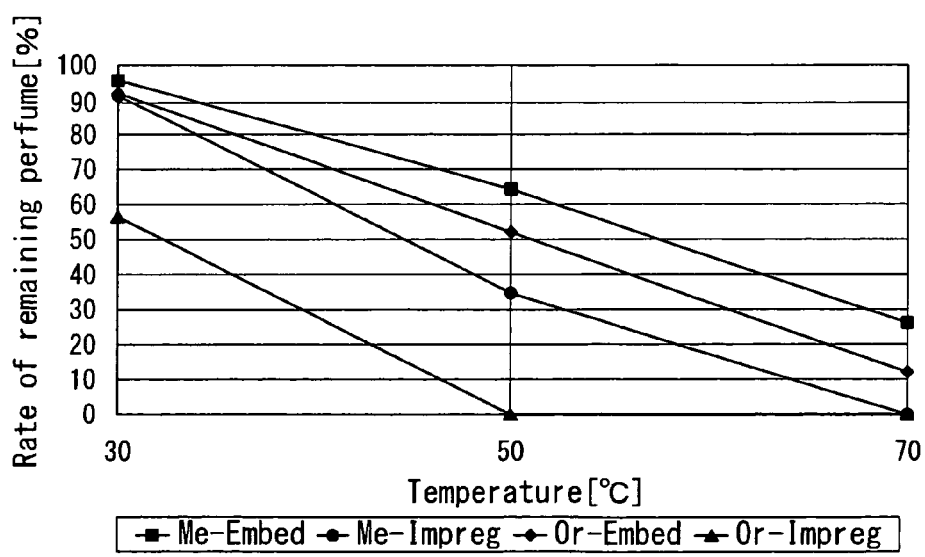
[FIG. 8] Graph showing the percentage of remaining flavorings at respective temperatures in Example 8

Simulating a cigarette, a device shown in FIG. 7 was assembled which includes a filling column 42 having an inner diameter of 8 mm, a dryer 41 connected to an inlet of the filling column 42 for supplying warm air into the column, and a pump 45 connected to an outlet of the filling column for sucking air in the filling column. In the filling column 42, cellulose granules 44 as a test sample were filled between absorbent cotton balls 43. In this setup, warm airs at 30° C., 50° C. and 70° C. were supplied separately at a flow rate of 35 ml/2 seconds, and then after 5 minutes, the cellulose granules were taken out and the remaining functional substance was measured based on the weight change. The result is shown in FIG. 8. In the figure, the menthol is shown as "Me" and the orange flavor as "Or", the impregnated granules as "Impreg." and embedded granules as "Embed". While the temperature in the cigarette filter increases when smoking, at the corresponding temperatures 50° C. and 70° C., the functional substances vaporize effectively. Also, carrying functional substance by embedding enables the flavoring to vaporize slower than the flavor agent retained by impregnation.

The invention claimed is:

1. Cellulose granules for carrying functional substances having an average particle diameter of 1.5 mm or smaller, each of said cellulose granules comprising a kneaded mixture of cellulose fibers and a binder, said cellulose granules being obtained by introducing said kneaded mixture into an extrusion granulating step, a spheronizing step and a drying step,
wherein said cellulose fibers have an average fiber length of 0.1 mm or longer and 0.5 mm or shorter and an average polymerization degree of 500 or over and 1200 or less.

2. The cellulose granules for carrying functional substances according to claim 1 wherein said cellulose fibers comprise acid-hydrolyzed cellulose fibers.

3. The cellulose granules for carrying functional substances according to claim 1 wherein said cellulose granules have a bulk density of 0.35 or over and 0.8 or less.

4. An additive agent for use in a cigarette filter comprising the cellulose granules for carrying functional substances according to claim 1, and a volatile functional substance carried on said cellulose granules.

5. The cellulose granules for carrying functional substances according to claim 2 wherein said cellulose granules have a bulk density of 0.35 or over and 0.8 or less.

6. An additive agent for use in a cigarette filter comprising the cellulose granules for carrying functional substances according to claim 2, and a volatile functional substance carried on said cellulose granules.

7. An additive agent for use in a cigarette filter comprising the cellulose granules for carrying functional substances according to claim 3, and a volatile functional substance carried on said cellulose granules.

8. An additive agent for use in a cigarette filter comprising the cellulose granules for carrying functional substances according to claim 5, and a volatile functional substance carried on said cellulose granules.

* * * * *